(12) United States Patent
Zayas (10) Patent No.: US 11,946,502 B1
(45) Date of Patent: Apr. 2, 2024

(54) PRESSURE-RELEASE CLAMP ASSEMBLY FOR AN ANCHOR ASSEMBLY

(71) Applicant: George Zayas, Miami, FL (US)

(72) Inventor: George Zayas, Miami, FL (US)

( * ) Notice: Subject to any disclaimer, the term of this patent is extended or adjusted under 35 U.S.C. 154(b) by 0 days.

(21) Appl. No.: 18/389,083

(22) Filed: Nov. 13, 2023

Related U.S. Application Data

(60) Provisional application No. 63/424,197, filed on Nov. 10, 2022.

(51) Int. Cl.
 *F16B 45/02* (2006.01)
 *B63B 21/00* (2006.01)
 *F16G 15/06* (2006.01)

(52) U.S. Cl.
 CPC ............ *F16B 45/029* (2021.05); *B63B 21/00* (2013.01); *B63B 2021/004* (2013.01); *F16G 15/06* (2013.01)

(58) Field of Classification Search
 CPC . F16B 45/029; B63B 21/00; B63B 2021/004; F16G 15/06
 See application file for complete search history.

(56) References Cited

U.S. PATENT DOCUMENTS

| 399,193 | A | * | 3/1889 | Glasgow | F16B 45/035 |
| | | | | | 24/601.5 |
| 1,166,382 | A | * | 12/1915 | Morse | A22B 5/06 |
| | | | | | 452/187 |
| 1,554,841 | A | * | 9/1925 | Clark | F16B 45/023 |
| | | | | | 24/600.1 |
| 1,685,201 | A | * | 9/1928 | St Pierre | F16G 17/00 |
| | | | | | 24/69 TT |
| 1,767,368 | A | * | 6/1930 | Jensen | B68B 5/00 |
| | | | | | 24/165 |
| 3,417,752 | A | * | 12/1968 | Butler | A61B 17/2833 |
| | | | | | 7/125 |
| 3,899,806 | A | * | 8/1975 | Berg | B66C 1/36 |
| | | | | | 294/82.23 |
| 5,368,339 | A | * | 11/1994 | Serot | F16L 41/12 |
| | | | | | 285/125.1 |
| 5,586,849 | A | * | 12/1996 | Kissel | B60P 3/075 |
| | | | | | 24/698.2 |

(Continued)

*Primary Examiner* — David M Upchurch
(74) *Attorney, Agent, or Firm* — Mark C. Johnson; Johnson Dalal (57) ABSTRACT

A pressure-release clamping assembly for an anchor assembly that includes clamping body defining a lower opening, having a pin coupled thereto and configured to restrict ambient access to the lower opening, defining an upper opening, having a clamping member translatably coupled to the clamping body, and having a pressure-release latch configured to lockedly couple with the clamping member and with a latch spring operably configured to bias the pressure-release latch toward the clamping member. The clamping member is operably configured to rotate and have a locked and an upper opening enclosing position with the clamping member retained in the locked position with the pressure-release latch, wherein the clamping member is configured to disengage with the pressure-release latch upon receiving at least a 100 lbf oriented with a longitudinal axis of the pressure-release latch and a released position with the clamping member at least partially removed from the clamping body.

12 Claims, 6 Drawing Sheets

(56) References Cited

U.S. PATENT DOCUMENTS

| | | | | |
|---|---|---|---|---|
| 8,888,155 | B2* | 11/2014 | Nommensen | F16B 45/023 |
| | | | | 294/82.19 |
| 2014/0291027 | A1* | 10/2014 | Marshall | E21B 23/00 |
| | | | | 175/57 |
| 2018/0345056 | A1* | 12/2018 | Kekahuna | F16B 45/02 |
| 2020/0339390 | A1* | 10/2020 | Boyd | F16G 15/06 |
| 2023/0175546 | A1* | 6/2023 | Schlipper | F16B 45/049 |
| | | | | 24/600.9 |

* cited by examiner

PRESSURE-RELEASE CLAMP ASSEMBLY FOR AN ANCHOR ASSEMBLY

FIELD OF THE INVENTION

The present invention relates generally to chackles or other devices selectively couplable to an anchor assembly and, more particularly, relates to a chackle having a clamp selectively removably couplable to the chain of an anchor.

BACKGROUND OF THE INVENTION

A temporary anchor is a structure, typically made from a metallic and weighted material, utilized to secure a marine vessel to the bed of a body of water. The weight of the anchor causes it to sink in the body of water and engage with the bed or other material or structure disposed at or around the bed, thereby preventing the marine vessel from drifting due to wind or current. Many marine vessels experience the problem of an anchor becoming stuck in or around the bed of the body of water.

Some methods and devices configured to release a stuck anchor include attempting to maneuver the vessel in a manner and applying a force to the coil chain and anchoring assembly through maneuvering of the vessel. This method can cause significant damage to the vessel and is unsafe for passengers on the vessel. Some other devices and methods include a chain release mechanism in the wheel or locker, but these can be difficult to utilize for some individuals and can be time-intensive. Some other devices are directed toward a breakable clasp or other structure located on or around the anchor, but this too has drawbacks that include whipping of the chain and damage caused to the vessel from release of the chain at or around contact point of the anchor. Those known devices and methods for retrieving an anchor involve solely utilizing the chain for the anchor, which, as discussed above, generates issues in the retrieval.

Therefore, a need exists to overcome the problems with the prior art as discussed above.

SUMMARY OF THE INVENTION

The invention provides a pressure-release clamping assembly for an anchor assembly that overcomes the hereinafore-mentioned disadvantages of the heretofore-known devices and methods of this general type and that effectively, safely, and efficiently allows an anchor to be retrieved by utilizing the clamp assembly to retrieve said anchor but, when experiencing a determined amount of force (or pressure), release said anchor from a chain utilized to retrieve said anchor.

With the foregoing and other objects in view, there is provided, in accordance with the invention, a pressure-release clamping assembly for an anchor assembly that includes a clamping body defining a lower opening, having two opposing lugs extending from the clamping body and each defining an enclosed opening with a pin disposed therein and configured to restrict ambient access to the lower opening, defining an upper opening, having a clamping member translatably coupled to the clamping body, and having a release latch assembly coupled to the clamping body and with a pressure-release latch configured to lockedly couple with the clamping member and with a latch spring operably configured to bias the pressure-release latch toward the clamping member. The clamping member is operably configured to translate with respect to the clamping body along a clamp translation path and to also have a locked position along the clamp translation path with the clamping member and the clamping body enclosing the upper opening and with the clamping member retained in the locked position with the pressure-release latch, wherein the clamping member is configured to disengage with the pressure-release latch upon receiving at least a 100 lbf oriented with a longitudinal axis of the pressure-release latch. The clamp translation path also includes a released position along the clamp translation path with the clamping member at least partially removed from the clamping body to un-enclose the upper opening.

In accordance with a further feature of the present invention, the lower opening spans from a lower terminal end of each of the lugs to an inner surface of the clamping body and with the pin selectively removably coupled to the clamping body and spanning across the lower opening.

In accordance with another feature of the present invention, the lower and upper openings are disposed in an adjacent configuration with one another.

In accordance with another feature, an embodiment of the present invention includes the release latch assembly having a button coupled to the clamping body and the pressure-release latch and operably configured to translate relative to the clamping body to compress the latch spring and place the clamping member in the released position.

In accordance with yet another feature of the present invention, the lower opening is configured and sized to retain and receive a first coil chain of an anchor assembly and the upper opening is configured and sized to retain and receive a second coil chain, the first coil chain and second coil chain indirectly coupled to one another.

In accordance with a further feature, an embodiment of the present invention also includes the release latch assembly having a plurality of lateral walls with one of the plurality of lateral walls is directly coupled to a button translatably coupled to the clamping body and configured to retain the latch spring and another of the plurality of lateral walls coupled to the clamping body, wherein the pressure-release latch is disposed within the latch spring and includes a telescopically connected portion directly coupled to the coupling body with a fastener.

Also in accordance with the present invention, a pressure-release clamping assembly for an anchor assembly is disclosed that includes a clamping body having a shackle configuration disposed on a lower end of the clamping body, defining a lower opening, having a selectively removable pin coupled to the clamping body and configured to restrict ambient access to the lower opening and defining an upper opening unconnected to the lower opening, a clamping member rotatably coupled to the clamping body with a hinge member and enclosing the upper opening, a release latch assembly coupled to the clamping body and with a pressure-release latch selectively lockedly coupled with the clamping member, a latch spring retained within the clamping body, surrounding the pressure-release latch, and operably configured to bias the pressure-release latch toward the clamping member, and a button coupled to the clamping body and the pressure-release latch and operably configured to translate relative to the clamping body to compress the latch spring and move the pressure-release latch away from the clamping member, wherein the clamping member is configured to disengage with the pressure-release latch upon receiving at least a 100 lbf oriented with a longitudinal axis of the pressure-release latch.

In accordance with a further feature, an embodiment of the present invention also includes the shackle configuration having two opposing and cantilevered lugs extending from the clamping body, each defining an enclosed opening with the selectively removable pin disposed therein.

In accordance with yet another feature, an embodiment of the present invention also includes the clamping member being operably configured to rotate with respect to the clamping body along a clamp translation path and to have a locked position along the clamp translation path with the clamping member and the clamping body enclosing the upper opening and with the clamping member retained in the locked position with the pressure-release latch and a released position along the clamp translation path with the clamping member at least partially removed from the clamping body to un-enclose the upper opening.

Although the invention is illustrated and described herein as embodied in a pressure-release clamping assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the clamping body or, when specified or suggested, the elongated direction of the chain(s) coupled to the clamping body, wherein "transverse" should be understood to mean a direction corresponding to a direction opposite of the longitudinal direction.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient pressure-release clamping assembly that is specially configured to release its clamping member when experiencing a set force vector, thereby enabling release of the chain and anchor attached thereto. Referring now to FIGS. 1-5, one embodiment of the present invention is shown in a different views. FIGS. 1-5, along with the other figures herein, show several advantageous features of the present invention, but, as will be described below, the invention can be provided in several shapes, sizes, combinations of features and components, and varying numbers and functions of the components. The first example of a pressure-release clamp assembly 100 is depicted and is configured to be utilized with an anchor assembly 300 having a coil chain 302 and an anchor (not shown). Said differently, the pressure-release clamp assembly 100 is configured to permanently retain a first coil chain 302 and configured to temporarily retain a second coil chain 306 until reaching a set force vector represented by arrow 304. When reaching the set force vector 304, a clamping member 104 translatably coupled to a body 102 of the pressure-release clamp assembly 100 is unreleased therefrom (represented with arrow 308), causing the coil chain 302 and anchor to be released without the long chain damaging the vessel or causing an unsafe anchor retrieval process. The first coil chain 302 and a second coil chain 306 may vary in size, but each link may define an inside length of approximately 0.5-2 in and an inside width of approximately 0.25-1in.

The clamp assembly 100 can be seen having a clamping body 102 of substantially rigid (referred to herein as "rigid") and preferably waterproof material, e.g., stainless steel, aluminum, PVC, etc. The clamping body 102 can be seen defining a shackle configuration at a lower end 106 and that opposes the clamping member 104 disposed at the upper end 108 of the body 102. The shackle configuration may include a crown 110 forming a U-shape, two opposing lugs 112a-b each extending downwardly from the crown and each defining enclosed openings 114a-b, respectively, and a pin 310 operably configured to be inserted through the enclosed openings 114a-b on the lugs 112a-b of the shackle. The pin 310 may be locked within the enclosed openings using, for example, a cotter pin, hair pin, etc. The pin 310 may include a pin head 400 disposed at a terminal end that is larger than the enclosed openings 114a-b. Each of the two opposing pin apertures 114a-b may be defined by threaded surfaces to threadedly couple with the pin 310. Said another way, the pin 310 may be selectively removably coupled to the clamping body 102 and may have a threaded configuration defined on one of the ends thereof. In other embodiments, the pin 310 may be a bolt that is inserted through the pin apertures and retained thereon using a nut, cotter pin, etc., The pin 310 may span across the lower opening 116 and is also of a substantially rigid and waterproof material. More specifically, the lower opening 116 spans from a lower terminal end of each of the lugs 112a-b to an inner surface (e.g., the curved crown 110) of the clamping body 102, wherein the pin 310 spans across a portion of the lower opening 116. The lugs 112a-b can also be seen formed in a cantilevered configuration.

As seen in the figures, the pin 310 and body 102 retain and couple to a link in the first coil chain 302. The link in the first coil chain 302 may be operably configured to rotate on the pin 310. To effectuate the same, the pin 310 may be a cylindrical shape or other oblong shape the facilitates in rotation of the link thereon. The pin 310 may be removed from the clamping body 102 to expose the lower opening 116 and remove the first coil chain 302 from the clamping body 102. When the pin 310 is coupled to the clamping body 102 it is preferably designed to withstand significant forces thereon, e.g., at least 250-300 lbf.

More specifically, the shackle configuration defines the lower opening 116 or clearance shaped and sized to receive the first coil chain 302. The clamping body 102 also defines an upper opening 118 shaped and sized to receive the second coil chain 306. The lower and upper openings 116, 118 may be disposed and defined adjacent to one another, i.e., without any other openings disposed therein between. The upper opening 118 is enclosed completely when the clamping member 104 is locked to a pressure-release latch 200 formed as part of a release latch assembly 500.

Figure 5:
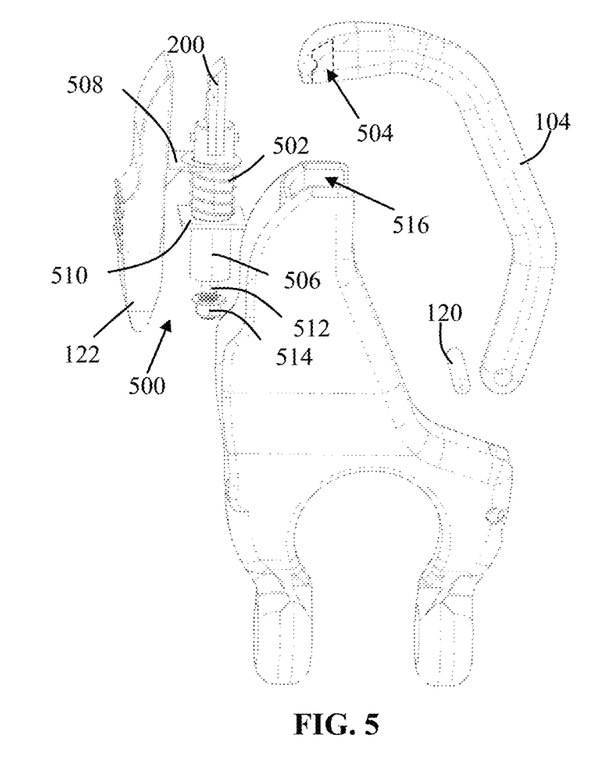
FIG. 5 is an exploded view of the pressure-release clamping assembly of FIG. 1.
Figure 6:
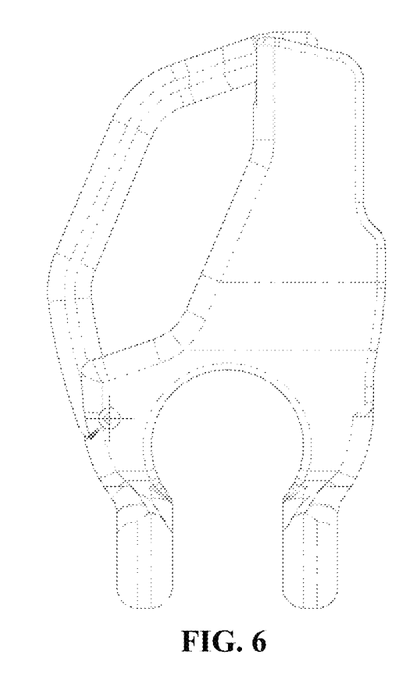
FIG. 6 is an elevational side view of the pressure-release clamping assembly of FIG. 1.
Figure 7:
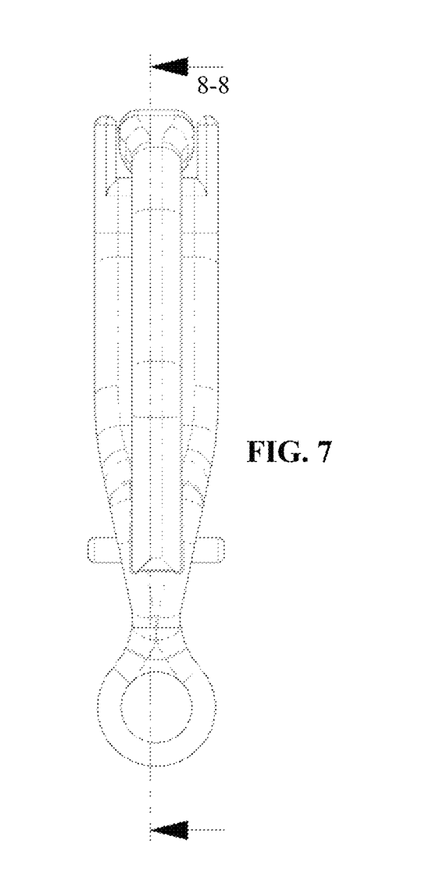
FIG. 7 is an elevational front view of the pressure-release clamping assembly of FIG. 1.
Figure 8:
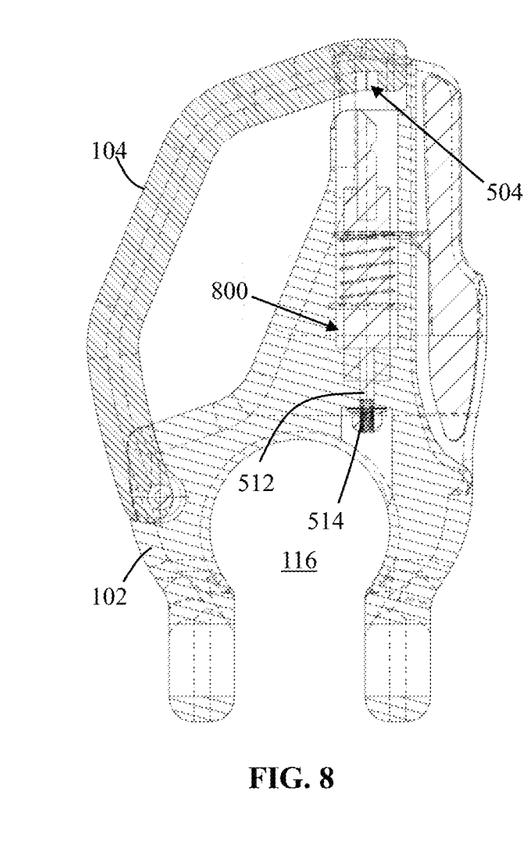
FIG. 8 is a cross-sectional view along section line 8-8 in FIG. 7.
Figure 9:
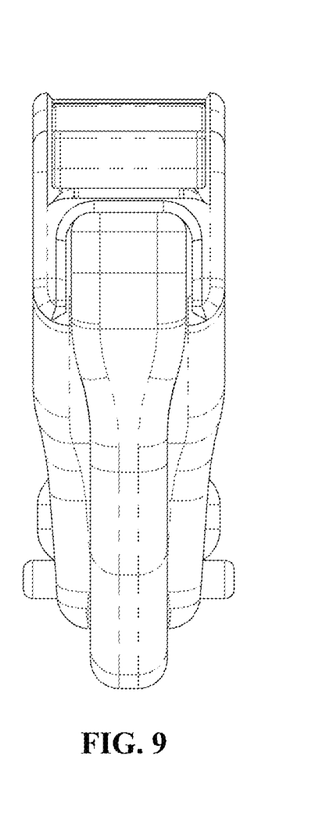
FIG. 9 is a top plan view of the pressure-release clamping assembly of FIG. 1.
Figure 10:
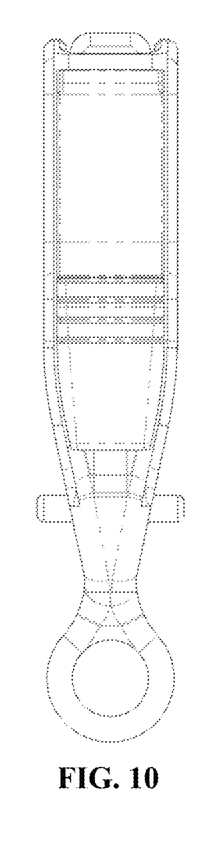
FIG. 10 is an elevational rear view of the pressure-release clamping assembly of FIG. 1.

The clamping member 104 is selectively removably coupled to the clamping body 102 and is operably configured to translate with respect to the clamping body 102 along a clamp translation path (also exemplified with arrow 308). The clamp translation path 308 may be curved, curvilinear, or linear. The clamping member 104 may be formed in an arcuate shape and may be hingedly coupled to the clamping body 102 on one end thereof. The clamping member 104 may be translatably or rotatably coupled to the clamping body 102 using a pin 120. The clamping member 104 is preferably of the same substantially rigid and water-resistant material as the clamping body 102. As best seen in FIG. 5 and FIG. 8, the clamping member 104 is preferably formed with a cavity or channel 504 sized to receive the pressure-release latch 200 and shaped to correspond with the shape of the pressure-release latch 200, namely the teeth portion seen thereon. Because the material of the pressure-release latch 200 and clamping member 104 are substantially rigid it takes at least approximately 100 lbf to engage (and disengage) the pressure-release latch 200 with the clamping member 104 (as the pressure-release latch 200 slightly flexes to be engaged with the clamping member 104). To facilitate in said locking position or engaged configuration, a latch spring 502 is utilized and is operably configured to bias the pressure-release latch 200 toward the clamping member 104, wherein the bias force may be around 60-70 lbf. Said another way, when the user desires to close the clamping member 104, the user may rotate the clamping member 104 toward the opening 516 defined at the upper end of the body 102 and the pressure-release latch 200. A wall or surface, e.g., surface 202 at or proximal to (e.g., with 1 in.) the distal end of the clamping member 104 may apply a downward force on the pressure-release latch 200 to move it downward while the clamping member 104 is still being rotated until the pressure-release latch 200 is ejected into the cavity or channel 504 of the clamping member 104. The external ridges or teeth, and/or male-female configuration enables the pressure-release configuration sufficient to withstand approximately 100-150 lbf of lifting force before the clamping member 104 is placed in the released position. Applying a force less than the set lifting force, e.g., by pulling or rotating on the clamping member 104, will be insufficient to remove the clamping member (unless the button 122 moves the pressure-release latch 200 downward).

Figure 1:
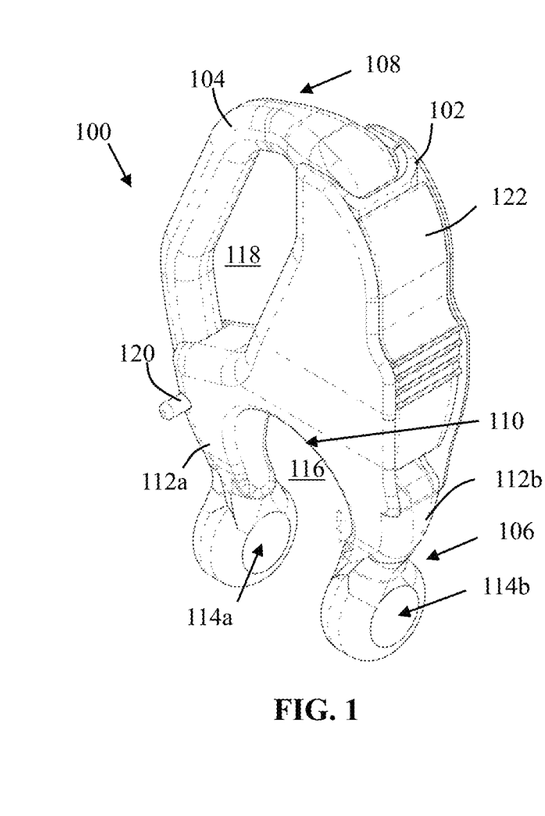
FIG. 1 is a perspective view of a pressure-release clamping assembly in a locked position and in accordance with one embodiment of the present invention.
Figure 2:
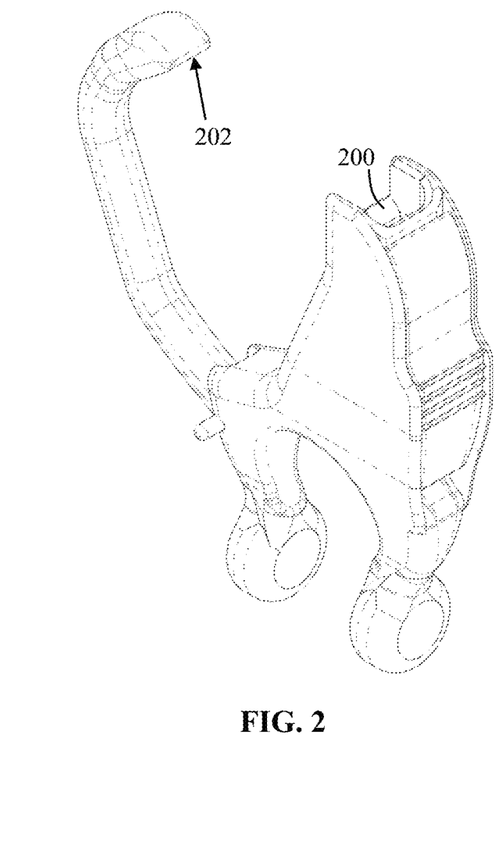
FIG. 2 is a perspective view of the pressure-release clamping assembly of FIG. 1 in a released position in accordance with one embodiment of the present invention.
Figure 3:
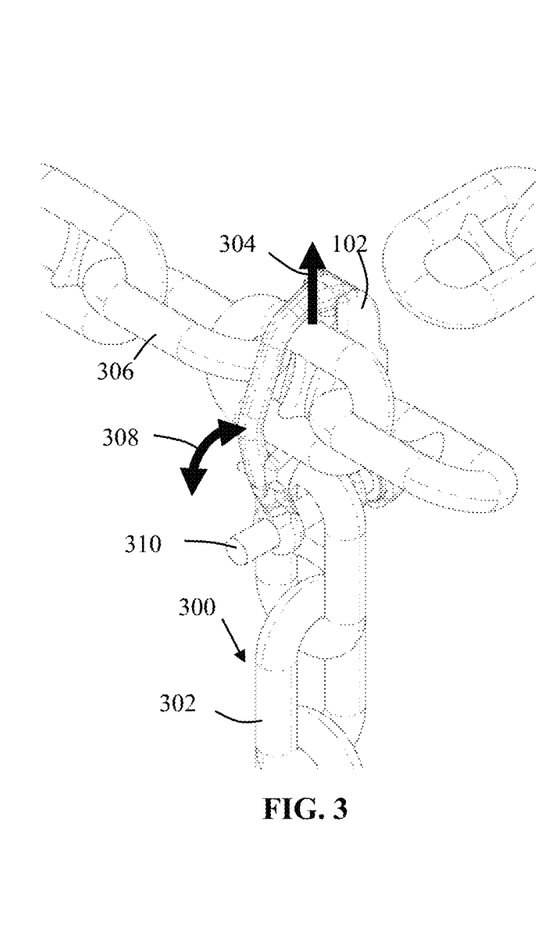
FIGS. 3-4 are perspective views of the pressure-release clamping assembly of FIG. 1 coupled to a first and second coil chain in accordance with one embodiment of the present invention.
Figure 4:
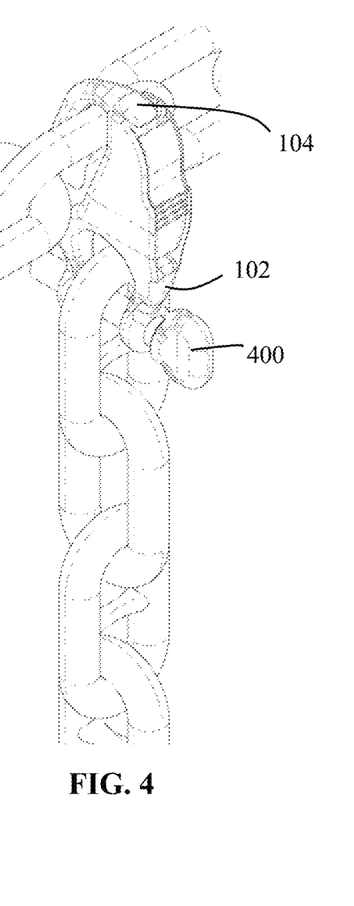

Beneficially, the clamping member 104 has a locked position with the clamping member 110 and the clamping body 102 enclosing the upper opening 118 and/or otherwise configured to retain the link of a second coil chain 306 within the upper opening 118. More specifically, the release latch assembly 500 can be seen coupled to the clamping body 102, preferably within the clamping body 102, and includes the pressure-release latch 200 configured to lockedly couple with the clamping member 104. The release latch assembly 500 includes the latch spring 502 operably configured to bias the pressure-release latch 200 toward the clamping member 104, wherein the clamping member 104 is operably configured to translate with respect to the clamping body 102 along a clamp translation path 308 to have a locked position (see, e.g., FIG. 3) and a released position (see, e.g., FIG. 2) along the clamp translation path 308. The locked position includes the clamping member 104 and the clamping body 102 enclosing the upper opening 118 and with the clamping member 104 retained in the locked position with the pressure-release latch 200. The clamping member 104 is configured to disengage with the clamping member 104, i.e., not be in the locked position, upon receiving at least a 100 lbf oriented with a longitudinal axis of the pressure-release latch 200. A force vector 304 is seen in FIG. 3 and include a magnitude and direction. Referring also to FIG. 5, an exemplary longitudinal axis 506 is also depicted, wherein the longitudinal axis may span through a median or centroid of the pressure-release latch 200. The longitudinal axis may also be considered to be defined as the axis in which the spring 502 compresses or decompresses. The longitudinal axis may also be described as an axis spanning from a lower end of the pressure-release latch to an upper end of the pressure-release latch (also seen depicted in FIG. 5).

The released position along the clamp translation path 308 may include the clamping member 104 at least partially removed from the clamping body 102 to un-enclose the upper opening 118 and permit the second coil chain 306 to be unretained and removed from the upper opening 118. When in the locked position, the second coil chain 306 may be compressed by the clamping member 104 or may be movable within the upper opening 118, wherein an end of the second coil chain 306 may be retained. As such, a broken chain 302 and/or stuck anchor may be retrieved by pulling the second coil chain 306, whereby the first coil chain 302 will be safely and effectively released if a set amount of force, e.g., 100 lbf, is experienced by the pressure-release clamping assembly 100. The amount of force can be varied based on the material utilized and the shape of the teeth formed by the pressure-release latch 200, wherein testing has shown most steel alloys will for the pressure-release latch 200 will suffice and wherein the pressure-release latch 200 includes a single notch or tooth of a width of approximately 0.1-0.2 inches and of a trapezoidal shape. The preferred set amount of force to trigger automatic release (or released position) of the clamping member 104 is between 120-150 lbf, wherein any greater than that has been proved to be unsafe for vessel inhabitants.

Figure 11:
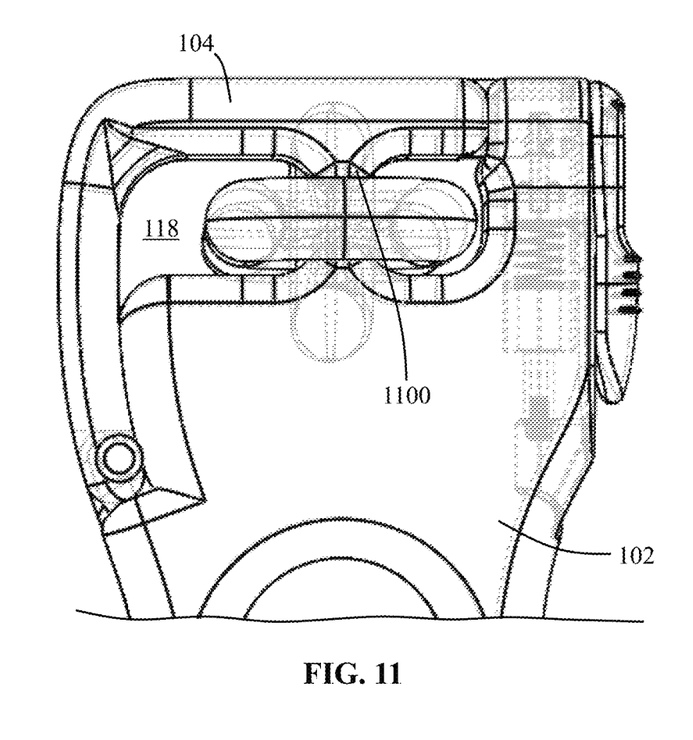
FIG. 11 is a partially transparent and fragmentary view of a pressure-release clamping assembly in accordance with another embodiment of the present invention.

In one embodiment, best seen in FIG. 11, the clamping member 104 and/or clamping body 102 has a portion (e.g., portion 1100 on the clamping member 104) configured to retain the link of a second coil chain within the upper opening 118. For example, the portion 1100 may protrude from an inner surface on either the clamping member 104 or clamping body 102 defining the upper opening 118 and is configured to taper in width so it can be received within one of the openings in the link of the second coil chain. The portion 1100 may be configured in size to extend approximately half-way through one of the openings in the link of the second coil chain where it meets (e.g., contacts or comes within proximity to, i.e., less than 0.25 in) another protruding member extending from an inner surface of the opposing structure, i.e., the clamping body 102 or clamping member 104. In other embodiments, one of the inner surfaces of the clamping member 104 or clamping body 102 may include a recess for receiving one of the protruding members.

Referring back to FIGS. 1-5, the clamping member 104 may be in the locked position with pressure-release latch 200 configured to engage with the clamping member 104 and operably configured to disengage with the clamping member 104 upon receiving at least 100 lbf thereon. Preferably, the pressure-release latch 200 will disengage with the clamping member 104 and place it in the released position when experiencing 150 lbf. The release latch assembly 500 may include a button 122 configured to receive a user's finger (i.e., provide for manual operation) and may include one or more ridged surfaces to provide resistance to a user's finger. The button 122 is coupled to the clamping body 102 and the pressure-release latch 200 and is operably configured to translate relative to the clamping body 102 to compress the latch spring 502 and place the clamping member 104 in the released position. The release latch assembly 500 also includes one or more lateral walls, e.g., 508, 510 for retaining the spring 502 and coupled to the clamping body 102 (best seen in FIG. 8).

The pressure-release latch 200 may have two portions, i.e., a head portion and a cylindrical base, wherein the head portion may be coupled to the cylindrical base with a pin or other fastener (enabling slight flexibility of the head portion). Beneficially, the base may include a bottom end or telescopic portion 512 with a threaded surface configured to receive or otherwise mate with a fastener 514 (e.g., screw or nut). Said another way, a plurality of lateral walls, e.g., 508, 510, may be utilized in the latch assembly 500, wherein one of the plurality of lateral walls, e.g., wall 508, is directly coupled to the button 122 that is translatably coupled to the clamping body 102. The wall 508 is configured to retain the latch spring 502 and may be permanently coupled to the latch member 200 with adhesive, welding, etc. The other lateral wall 510 may be coupled to the clamping body 102 or otherwise providing resistance to downward movement of the button 122. The button 122 is operably configured to translate relative to the clamping body, e.g., linearly, to compress the latch spring 502 and move the pressure-release latch 200 away from the clamping member 104.

As seen best in FIG. 5 and FIG. 8, the pressure-release latch 200 is disposed within the latch spring 502 and include may include a telescopically connected portion, e.g., portion 512, directly coupled to the coupling body 102 with a fastener 514. To that end, the clamping body 102 may define a channel 800 for housing the pressure-release latch 200, the latch spring 502, and the lateral walls 508, 510. An additional recessed channel may span within the body 102 for receiving the portion 512 of the pressure-release latch 200 that is connected to the fastener 514. An access port defined by the body 102 may also be provided and that is accessible through lower opening 116, wherein the access port is shaped and sized to receive the fastener 514 therein and with the fastener 514 coupled to an internal wall of the body 102 and within the access port.

The clamping member 104 may configured to have the released position along the translation path 308, wherein the translation path 308 may be curved, linear, or curvilinear, and with the clamping member 104 at least partially removed from the clamping body 102 to un-enclose the upper opening 118 and un-retain the link of the second coil chain 306 with the portion of the clamping member 104. Said another way, one a pull or tensile force of approximately 100-150 lbf is experienced on the second coil chain 306, particularly when attempting to retrieve an anchor, the clamping member 104 will be placed in the released position and cause the second coil chain 306 to be released from the clamping body 102. The user will then be able to recouple the clamping member 104 to the second coil chain 306 as desired. The lower opening 116 is configured and sized to retain and receive a first coil chain 302 of an anchor assembly 300 and the upper opening 118 is configured and sized to retain and receive a second coil chain 306, wherein the first coil chain 302 and second coil chain 306 are indirectly coupled to one another, i.e., they are separate chains.

Although a specific order of executing process steps has been described or depicted herein, the order of executing the steps may be changed relative to the order shown in certain embodiments. Also, two or more steps shown or described as occurring in succession may be executed concurrently or with partial concurrence in some embodiments. Certain steps may also be omitted for the sake of brevity. In some embodiments, some or all of the process steps included can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features.

What is claimed is:

1. A pressure-release clamping assembly for an anchor assembly comprising:
   a clamping body defining a lower opening, having two opposing lugs extending from the clamping body and each defining an enclosed opening with a pin disposed therein and configured to restrict ambient access to the lower opening, defining an upper opening, having a clamping member translatably coupled to the clamping body, and having a release latch assembly coupled to the clamping body and with a pressure-release latch configured to lockedly couple with the clamping member and with a latch spring operably configured to bias the pressure-release latch toward the clamping member, the clamping member operably configured to translate with respect to the clamping body along a clamp translation path and have:
      a locked position along the clamp translation path with the clamping member and the clamping body enclosing the upper opening and with the clamping member retained in the locked position with the pressure-release latch, wherein the clamping member is configured to disengage with the pressure-release latch upon receiving at least a 100 lbf oriented with a longitudinal axis of the pressure-release latch; and
      a released position along the clamp translation path with the clamping member at least partially removed from the clamping body to un-enclose the upper opening.

2. The pressure-release clamping assembly according to claim 1, wherein the lower opening spans from a lower terminal end of each of the lugs to an inner surface of the clamping body and with the pin selectively removably coupled to the clamping body and spanning across the lower opening.

3. The pressure-release clamping assembly according to claim 1, wherein the lower and upper openings are disposed in an adjacent configuration with one another.

4. The pressure-release clamping assembly according to claim 1, wherein the release latch assembly further comprises:
   a button coupled to the clamping body and the pressure-release latch and operably configured to translate relative to the clamping body to compress the latch spring and place the clamping member in the released position.

5. The pressure-release clamping assembly according to claim 1, wherein the lower opening is configured and sized to retain and receive a first coil chain of an anchor assembly and the upper opening is configured and sized to retain and receive a second coil chain, the first coil chain and second coil chain indirectly coupled to one another.

6. The pressure-release clamping assembly according to claim 1, wherein the release latch assembly further comprises:
   a plurality of lateral walls with one of the plurality of lateral walls is directly coupled to a button translatably coupled to the clamping body and configured to retain the latch spring and another of the plurality of lateral walls coupled to the clamping body, wherein the pressure-release latch is disposed within the latch spring and includes a telescopically connected portion directly coupled to the coupling body with a fastener.

7. A pressure-release clamping assembly for an anchor assembly comprising:
   a clamping body having a shackle configuration disposed on a lower end of the clamping body, defining a lower opening, having a selectively removable pin coupled to the clamping body and configured to restrict ambient access to the lower opening and defining an upper opening unconnected to the lower opening;
   a clamping member rotatably coupled to the clamping body with a hinge member and enclosing the upper opening;
   a release latch assembly coupled to the clamping body and with a pressure-release latch selectively lockedly coupled with the clamping member, a latch spring retained within the clamping body, surrounding the pressure-release latch, and operably configured to bias the pressure-release latch toward the clamping member, wherein the clamping member is configured to disengage with the pressure-release latch upon receiving at least a 100 lbf oriented with a longitudinal axis of the pressure-release latch; and
   a button coupled to the clamping body and the pressure-release latch and operably configured to translate relative to the clamping body to compress the latch spring and move the pressure-release latch away from the clamping member.

8. The pressure-release clamping assembly according to claim 1, wherein the shackle configuration further comprises:
   two opposing and cantilevered lugs extending from the clamping body each defining an enclosed opening with the selectively removable pin disposed therein.

9. The pressure-release clamping assembly according to claim 8, wherein the lower opening spans from a lower terminal end of each of the lugs to an inner surface of the clamping body and with the selectively removable pin spanning across the lower opening.

10. The pressure-release clamping assembly according to claim 8, wherein the lower opening is configured and sized to retain and receive a first coil chain of an anchor assembly and the upper opening is configured and sized to retain and receive a second coil chain, the first coil chain and second coil chain indirectly coupled to one another.

11. The pressure-release clamping assembly according to claim 8, wherein the clamping member is operably configured to rotate with respect to the clamping body along a clamp translation path and have:
   a locked position along the clamp translation path with the clamping member and the clamping body enclosing the upper opening and with the clamping member retained in the locked position with the pressure-release latch; and a released position along the clamp translation path with the clamping member at least partially removed from the clamping body to un-enclose the upper opening.

12. The pressure-release clamping assembly according to claim 8, wherein the release latch assembly further comprises:

a plurality of lateral walls with one of the plurality of lateral walls is directly coupled to a button translatably coupled to the clamping body and configured to retain the latch spring and another of the plurality of lateral walls coupled to the clamping body, wherein the pressure-release latch is disposed within the latch spring and includes a telescopically connected portion directly coupled to the coupling body with a fastener.

\* \* \* \* \*